W. STONE.
GRINDING WHEEL GUARD.
APPLICATION FILED DEC. 3, 1909.
953,496.
Patented Mar. 29, 1910.
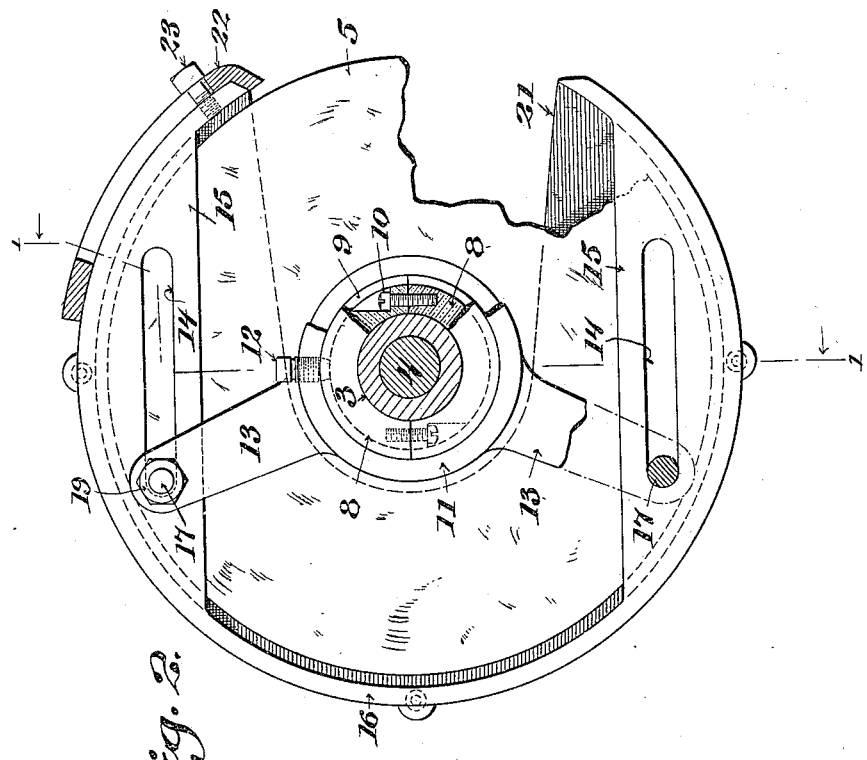
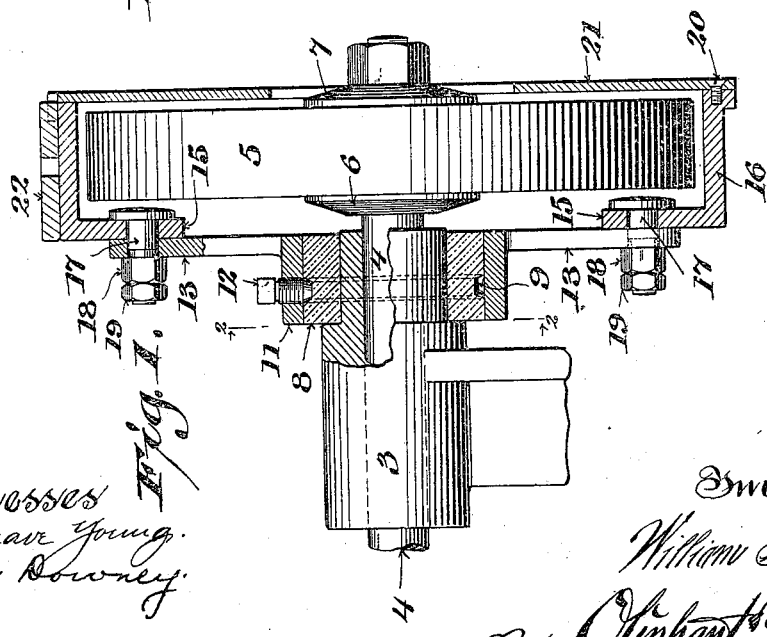

UNITED STATES PATENT OFFICE.

WILLIAM STONE, OF MILWAUKEE, WISCONSIN.

GRINDING-WHEEL GUARD.

953,496.  Specification of Letters Patent.  Patented Mar. 29, 1910.

Application filed December 3, 1909. Serial No. 531,197.

*To all whom it may concern:*

Be it known that I, WILLIAM STONE, a citizen of the United States, and resident of Milwaukee, in the county of Milwaukee and State of Wisconsin, have invented certain new and useful Improvements in Grinding-Wheel Guards; and I do hereby declare that the following is a full, clear, and exact description thereof.

My invention consists in what is herein particularly set forth with reference to the accompanying drawings and pointed out in claims, its object being to provide simple, economical and efficient guards by which to partially inclose grinding-wheels and prevent flying of fragments of same in case of fracture; provision being had for varying the area of a peripheral front opening of each guard, and for adjusting said guard to compensate for wear of the wheel within its confines.

Figure 1 of the drawings represents a sectional view on different planes indicated by lines 1—1 in Fig. 2, and illustrates the application of a guard in accordance with my invention with respect to a grinding-wheel. Fig. 2 of said drawings represents a hub-side elevation of the guard in use, parts in the showing being in section on the plane indicated by line 2—2 in Fig. 1, and other parts broken.

Referring by numerals to the drawings, 3 indicates a bearing for the arbor 4 of a grinding-wheel 5 that is held rigid on said arbor between a permanent flange 6 and a removable flange 7 of same. Clamped upon the preferably shouldered outer end of the bearing 3 is a spacing-collar 8 having the periphery thereof provided with an annular groove 9, said collar being made in sections joined together by clamp screws 10, as clearly illustrated in Fig. 2.

The diameter of the spacing-collar is equal to or greater than that of the arbor-flange 6, and slipped past said flange onto said collar is the hub 11 of a support, in the form of a two arm spider. A set-screw 12 is employed to hold the spider-hub in rigid connection with the spacing collar, said screw being engageable with the collar-groove, and because of this groove said hub may be fastened at any point on said collar. In some instances, the spacing-collar may be omitted and the spider-hub made to have direct connection with the aforesaid arbor-bearing.

Engaging the ends of the arms 13 of the spider and horizontal slots 14, in opposite vertical side flanges 15 of a circular hood 16 are bolts 17 having clamp-nuts 18 and set-nuts 19 run on their screw-threaded outer ends. Held by screws 20 in connection with the hood 16, opposite the flanges of same, is a recessed side plate 21, and a similar plate provided with horizontal slots for the bolts 17 may be substituted for said flanges of said hood.

The grinding-wheel is within the confines of the hood and said hood is open at the front to the periphery of said wheel. The side plate 21, is preferably recessed, as herein shown, to afford access to the side of the grinding-wheel. To provide for regulating the area of the opening of the hood, a longitudinally slotted slide 22 is employed in connection with said hood, the slide being held in adjusted position by a set-screw 23 engaging its slot and the aforesaid head. From time to time incidental to wearing down of the face of the grinding-wheel, the bolts 17 are loosened, the hood moved rearward, a sufficient distance to compensate for the wear, and the bolts again tightened. If the spacing-collar 8 be employed, the guard as a whole may be readily removed, after removal of the grinding-wheel from its arbor, the bore of the spider-hub being of sufficient diameter to clear the permanent flange of said arbor.

I claim:

1. The combination, of a support, means for rigidly securing the support in connection with a bearing for the arbor of a grinding-wheel, a front open circular hood having horizontally slotted side flanges, bolts engaging said supports and the slots of said flanges, and nuts run on the bolts to secure the hood in position to encompass said wheel.

2. The combination of a support, means for rigidly securing the same in connection with a bearing for the arbor of a grinding-wheel, an open front circular hood in connection with the support to encompass said wheel, and a recessed side plate in connection with the hood.

3. The combination of a support, means for securing the same in connection with a bearing for the arbor of a grinding-wheel, an open front circular hood in connection with the support to encompass the wheel, a recessed side plate attached to the hood, and a slide adjustable on said hood to vary the area of the front opening of same.

In testimony that I claim the foregoing I have hereunto set my hand at Milwaukee in the county of Milwaukee and State of Wisconsin in the presence of two witnesses.

WILLIAM STONE.

Witnesses:
 FRANK OPPERMANN,
 PAUL F. WENZEL.